United States Patent [19]

Read, Jr.

[11] 3,852,871

[45] Dec. 10, 1974

[54] METHOD OF MANUFACTURING A WELL FOR A WASHPOT ASSEMBLY

[75] Inventor: Reginald A. Read, Jr., Brookfield, Ill.

[73] Assignee: Regdon Corporation, Brookfield, Ill.

[22] Filed: Oct. 1, 1973

[21] Appl. No.: 402,477

[52] U.S. Cl.............. 29/445, 29/523, 29/602, 285/382.4, 335/240
[51] Int. Cl..... B23p 9/00, B21d 39/00, B23p 11/02
[58] Field of Search ............ 29/445, 525, 523, 602; 285/382.4; 335/240

[56] References Cited
UNITED STATES PATENTS

| | | | |
|---|---|---|---|
| 1,552,375 | 9/1925 | Ainsworth | 335/240 |
| 1,970,481 | 8/1934 | Young et al. | 29/523 UX |
| 2,352,119 | 6/1944 | Putt | 335/240 |
| 2,728,976 | 1/1956 | Kraus | 29/445 X |
| 2,754,573 | 7/1956 | Schoessow | 29/523 UX |
| 3,017,695 | 1/1962 | James | 29/523 |
| 3,156,042 | 11/1964 | Reed | 29/523 UX |
| 3,331,117 | 7/1967 | Jacobellis | 29/445 X |
| 3,497,946 | 3/1970 | Tingley | 29/523 X |
| 3,538,792 | 11/1970 | Stillwagon | 29/523 X |

Primary Examiner—Charlie T. Moon
Attorney, Agent, or Firm—Neuman, Williams, Anderson & Olson

[57] ABSTRACT

A dashpot solenoid is provided having a thin-walled well with a support ring around an accurately sized and shaped slightly reduced mouth portion and an adjustable air metering orifice at the bottom or opposite end. A plunger coated with a polyfluoro hydrocarbon is sized and shaped to fit within the well such that the clearance between the plunger and the mouth portion of the well provide a functionally airtight sliding fit. In operation the plunger is drawn into the well and air captured therein is permitted to escape through the adjustable metering orifice at a rate which damps the plunger motion.

9 Claims, 5 Drawing Figures

PATENTED DEC 10 1974
3,852,871
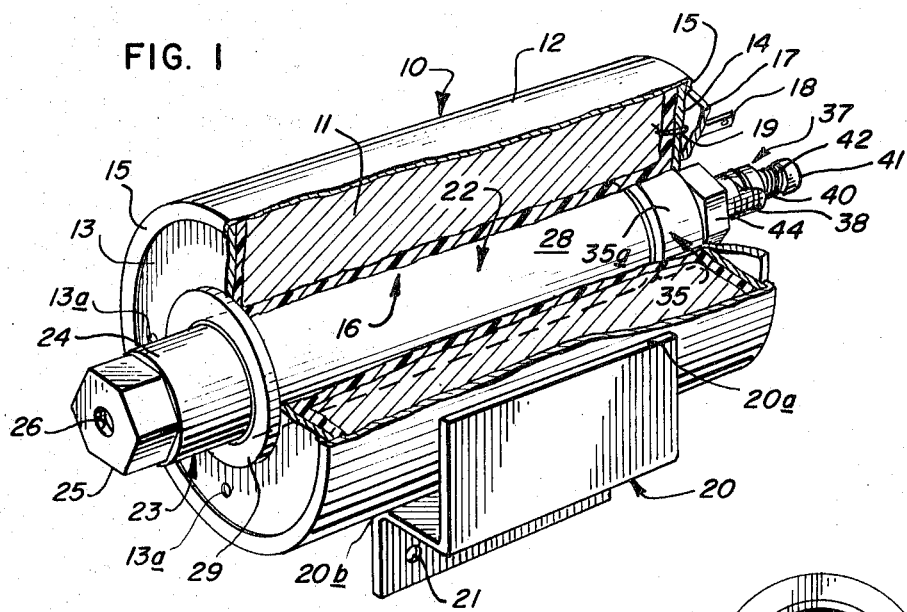
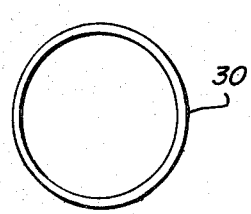
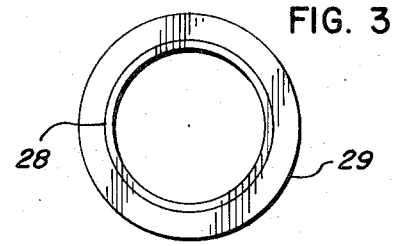
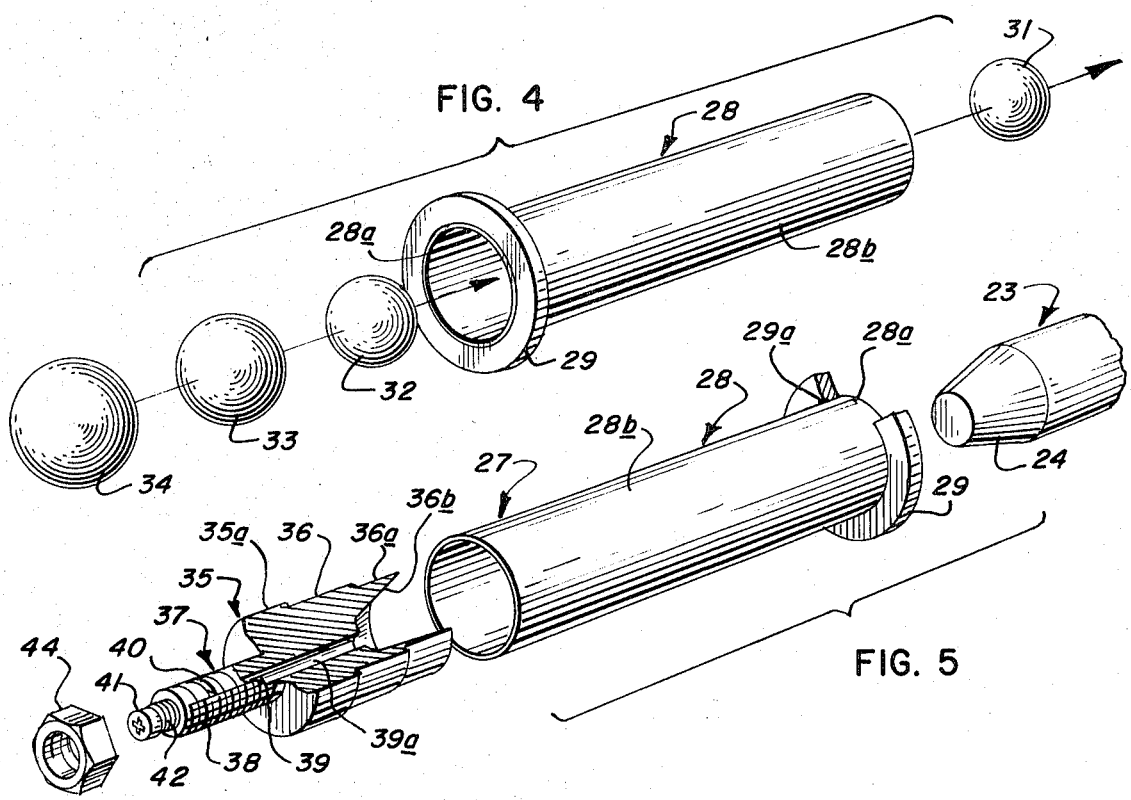

METHOD OF MANUFACTURING A WELL FOR A WASHPOT ASSEMBLY

The invention relates to air damped or dashpot solenoids and more particularly to a new development for the accurate and economical construction and manufacture of the well and plunger units for such solenoids.

It is known that damping or shock-absorbing devices may be applied to or constructed integral with a solenoid apparatus. Various dampers that cushion the plunger by metering escaping fluid, using resilient bumpers, and creating friction or resistance between cooperating members are disclosed in the prior art. The U.S. Pat Nos. to Flentge 3,400,351, Hallgreen 3,326,511, Dube 3,159,774, Jamieson, 2,931,617, Kouyoumjian 2,377,244, Wetzel 2,111,232 and Wetzel 2,207,082 are representative of various approaches and constructions. Heretofore, dashpot solenoids having a substantially sealed well and/or a tightly fitting plunger required expensive manufacturing techniques and sophisticated sealing members to assure reliable and adjustable operation. Minimum clearance between the plunger and the well is necessary in order to prevent cocking, chatter and seizure. In order to give the required fit, careful, accurate and expensive machines and machining techniques have been necessary. Similarly, reliability and uniformity of such close tolerance components have always been a problem.

The instant invention provides a technique and construction which minimizes the expense of manufacture and assembly of such dashpots while affording the necessary functionally airtight fit between the plunger and the well tube. Moreover, in the presently preferred embodiment disclosed herein in detail, the high tolerance components are easily separable from lower tolerance components.

Previous dashpot solenoids have failed to include desirable features which allow inexpensive manufacture and maintenance in an adjustable dashpot solenoid which gives uniform reliable performance.

It is an object of the subject invention to overcome the disadvantages and complexities of the prior art.

It is a more specific object of this invention to consistently provide accurately sized solenoid well devices in an economical manner.

It is another object of the present invention to provide an improved dashpot solenoid which can be easily and inexpensively manufactured to give substantially identical performance or plunger motion for every unit manufactured.

It is a further object of this invention to provide solenoid wells of thin-walled tubular stock with sufficiently accurate and consistent tolerances to provide effectively airtight sliding fits with armature/plungers.

It is yet another object of the present invention to provide a manufacturing technique which is simple and economical, requiring relatively inexpensive tools, and also allowing for a high degree of accuracy and reliability in the manufacture and assembly of air damped solenoid units.

Additional objects and advantages of the present invention will become apparent as the following description proceeds and the features of novelty which characterize this invention are pointed out with particularity in the claims annexed to and forming a part of this specification.

In carrying out the invention in one embodiment, a dashpot solenoid is constructed with a well having a thin-walled tube for its body and a plug closure for its bottom end. A reinforcing ring is pressed onto the top or mouth end of the tube. After the ring is pressed onto the tube, but before the plug is attached, a series of successively larger balls are pushed through the tube to expand and form the ringed portion to an accurate inner diameter and uniform shape (circular), and simultaneously to insure adequate sizing and truing of the balance of the tube. The plug is press fit, being an interference fit and also having a circular shape, thus acting to close the bottom end. The ring and the plug maintain the size and shape of the tube body. A plunger having a ground cylindrical outer surface and a polyfluoro hydrocarbon nonstick coating slidably fits in the sized and shaped well. The plunger fits closely within the inner diameter of the well, particularly within the ringed portion, such that when the plunger is drawn into the well, air captured therein will not readily escape between the plunger and the tube wall. A valve for air bleeding is provided in the plug to adjustably vent the captured air. This valve has an air passage and a bleed screw intersecting the passages to meter the amount or rate of air flow. The plunger and tube assembly with the valve is a separate and distinct subassembly which may be used with a winding or coil of wire and related electromagnetic components to form an electrical solenoid. A simple connection is provided between the dashpot and winding to permit convenient assembly and ready interchangeability. For that purpose there is a threaded exterior on the dashpot plug which is easily and securely held within the solenoid winding by a nut.

For a more complete understanding of this invention, reference should now be had to the embodiment illustrated in greater detail in the accompanying drawing and described below by way of an example of the invention. In the drawing:

FIG. 1 is a perspective view of a dashpot solenoid embodying teachings of this invention, with a portion cut away for illustrative purposes;

FIG. 2 is an end view of thin-walled seamless tubing from which the dashpot body is made;

FIG. 3 is an end view of the combination of reinforcing ring and tube;

FIG. 4 is a perspective view of the ringed tube with sizing balls in a schematic presentation of the ball sizing process; and FIG. 5 is an exploded perspective of the dashpot assembly.

Referring to the drawings, a solenoid and dashpot apparatus is shown in FIG. 1 and is generally indicated by the numeral 10. This apparatus 10 includes a winding or coil 11 covered by a cylindrical sleeve or outer shell 12 of high magnetic permeability material and a pair of washer-like end plates of high magnetic permeability material comprising plate 13 for the front and plate 14 for the rear. To secure the coil 11 within the outer shell 12 the front and rear edges of the shell are turned inward as shown in FIG. 1 at 15. The coil 11 comprises a number of turns of insulated wire wound on a spool-shaped bobbin 16 of a low permeability, high dielectric insulative material, as in a known construction. Captured within the inturn edges 15 of shell 12 are from front to rear the front end plate washer 13, the bobbin 16 with the coil 11 and the rear end plate washer 14. A terminal board 17 which is also washer-like in shape is riveted to the outer face of plate 14 and includes a pair of terminals 18 attached thereto. The terminal board can be made of a known material such as phenolic impregnated linen which has both strength and a high dielectric. Aligned openings 19 in the rear end plate 14, the terminal board 17 and the bobbin 16 allow the extremeties of the coil wire to pass therethrough so that it may be soldered to the terminals 18.

In FIG. 1, two techniques for mounting the dashpot solenoid apparatus 10 are shown by way of example. Elongated bracket 20 is a Z-shaped member with an extended mounting flange having mounting holes 21, only one of which is shown. Bracket 20 is secured to outer shell 12 as by welding in the area 20a near the top of one leg of the Z and by tack welding at 20b near the ends of one angle of the Z. The other or second feature for mounting consists of a series of tapped mounting holes 13a in end plate 13. Thus, by means of cooperating screws the solenoid apparatus 10 may be mounted cantilever fashion off of front end plate 13.

The dashpot plunger assembly generally labeled 22, includes a plunger 23 with a right circular cylindrical body. The illustrated plunger has a truncated leading end portion 24. Other shapes of the leading end portion will provide different operating characteristics of the solenoid. As shown in FIG. 1, plunger 23 has a hexagonal nut-like attaching end portion 25 having a threaded opening 26. As is common practice with solenoid armatures or plungers for electromagnets, the plunger 23 is of highly magnetically permeable ferric material. In order to provide the cylindrically-shaped body, plunger 23 typically is ground on a centerless grinder. The ground-shaped plunger 23 preferably is coated with a permanent lubricant such as polyfluoro hydrocarbon material, e.g., the product sold by Du Pont Company, under the trademark "Teflon," so that surface binding and friction are minimized. The anti-stick properties of such materials are well known and they perform well in this particular application.

The dashpot assembly 22 also includes the well 27 which comprises a thin-walled, non-magnetic tube 28, a reinforcement ring 29 and an end plug 35. The tube 28 may be cut from a length of seamless thin wall standard stock brass tubing 30, best shown in FIG. 2. The tube 28 is cut to length and the corners are broken before assembly with the ring 29. The ring has an accurately machined circular inside diameter and is of a slightly less nominal inside diameter than the outside diameter of the tube to provide a press fit between these components. Ring 29 may be steel or other appropriate malleable material. A slight chamfer is provided at 29a to facilitate assembly on the tube 28. It has been found that about a 0.005 inch interference fit between the ring 29 and the tube 28 is sufficient to size and shape the ringed end of the tube as described further below, and to secure these components together.

In order to obtain the desired sliding seal dashpot cooperation of the plunger 23 and the well 27 without relying on sealing rings, gaskets or other added sealing elements, it is important to provide a close tolerance sliding fit between the tube and the plunger. Plungers can be accurately and consistently formed within close tolerances by known production processes, e.g., centerless grinding. As to the tube 28, size and functional parameters make it highly preferable to use a thin-walled seamless member, e.g., brass tubing on the order of 0.020 to 0.035 inch wall thickness. Cost factors also render it highly desirable to use stock tubing material for this tube. However, it has been found that stock brass seamless thin wall tubing of a given nominal inside diameter often varies significantly in actual inside diameter and particularly in cylindricity or cross-sectional configuration, tending to be slightly oval in many instances. More particularly, such tubing often varies sufficiently from a true and accurate right circular cylindrical cross section to preclude consistently obtaining the requisite sliding fit with a cylindrical plunger 23. Moreover, apparently due to the inherent low strength of the thin walls and internal stresses as well as external loads which may be applied inadvertently, such tubing does not reliably retain the necessary cross-sectional uniformity following reworking to prescribed tolerances.

The aforenoted problems and requirements are met in assembly 27 by press-fitting the accurately machined ring 29 over one end of the tube 28 and thereby constricting the tube portion 28a within the ring, then contouring and sizing the tube and the applied ring as necessary to provide an accurately-sized cylindrical inner bore, and then closing the opposite end of the tube 28 with a plug 35, as will be described further below.

In the sizing of the tube 28 in the ring 29, the inner diameter is adjusted and contoured such that the final inner diameter of the tube will provide a close effective air-seal sliding fit with plunger 23, at least within the ringed end portion. In this regard, the force fit of ring 29 may cause the tube 28 initially to have a slightly reduced inner diameter in the region of the ring 29. In any event, the wall of the tube 28 is formed and expanded as necessary to provide a circular bore of the correct inner diameter for the plunger clearance within the ringed end portion 28a, with the ring in compressive contact with the sized tube portion 28a therewithin. A plunger-tube clearance in this area which has been found to be satisfactory for present air-control purposes is on the order of 0.0005 inch, with the ovality or variation of diameters of the plunger and of the tube within the ring being less than about 0.0001 inch. The remainder or main body portion 28b of the tube 28 also is sized and trued in the same general operation as the sizing of the ringed end portion. However, a somewhat greater tolerance of diameter oversize and ovality is allowable beyond the ring end in this main body portion 28b. In this latter area, a relatively close fit will enhance the overall air-seal effect, but the primary consideration is to insure sufficient physical clearance of the tube wall from the armature/plunger to prevent physical interference with reciprocating operation of the armature as by binding or jamming. Thus a somewhat greater nominal inner diameter of the finished tube is provided in this area as necessary to allow for any residual ovality of the tube.

An inexpensive and accurate method of sizing the ringed tube 28 without distorting the tube is by passing a series of balls through the tube as illustrated in FIG. 4, wherein balls 31 through 34 are shown. As is apparent, each succeeding ball is slightly larger than the predecessor such that the initial inner diameter of tube 28 will at least pass ball 31, and that diameter can be increased and trued to that of ball 34 by, in turn, pushing each ball through tube 28. The tube 28 may be checked for tolerances and for fit with a given plunger 23 after each ball pass. If further ball sizing is necessary the next larger ball may be used. Balls made of tungsten carbide and having incremental size variations of 0.00025 inch have worked satisfactorily in production. The ball sizing will have a somewhat different effect at the ringed-end portion as contrasted to the balance of the tube body because of the reinforcing effect of the ring. That is, the ringed end will be expanded somewhat less than the tube body such that the closest clearance between the tube 28 and the plunger 23 normally will be established at the ringed-end section 28a.

After the ball sizing or "ballizing" operation, the stopper or plug 35 is applied. This plug is formed of material having high magnetic permeability and has a generally cylindrical shape with a nose end portion 36 for insertion in tube 28 at the end opposite the ringed end, see FIG. 5. The outer diameter of end 36 is slightly larger, e.g., approximately 0.005 inch larger, than the inner diameter of tube 28 to provide an interference fit, but there may be a chamfer or transition section 36a of lesser diameter at the leading end to facilitate assembly. Thus, it can be appreciated that the plug 35 is held securely and assists in maintaining the main body portion of the tube 28 circular and at the proper size. An annular shoulder 35a is included on plug 35 and is of an outer diameter which is substantially identical to the outer diameter of tube 28. The shoulder 35a is of a length to extend the overall length of assembly 27 to correspond to the coil 11. It will be appreciated that closures of other configurations may be used.

On the end of plug 35 opposite nose 36 there is an elongated boss 37 with external threads 38 and an axial threaded bore 39 therethrough. The bore 39 communicates with a further axial bore 39a extending to the inside of nose 36 which is provided with a concave recess 36b to receive truncated conical end 24 of plunger 23. A lateral bleed port 40 is cut into the shank of boss 37 so that it communicates with threaded bore 39. For valving purposes a bleed port adjustment screw 41 is threaded into bore 39. A compression spring 42 fits about the outwardly-extending end of screw 41 for resiliently locking screw 41 in any selected position.

The outer diameter of the tube 28 and shoulder 35a of assembly 22 are slightly smaller than the inner diameter of bobbin 16 and an aligned central opening in end plate 13. Consequently, dashpot assembly 22 is readily inserted into the bobbin 16 during assembly and will fit snugly within the bobbin. However, a close tolerance fit is not required between these assemblies. To secure the dashpot assembly 22 to the winding 11, threaded boss 37 extends through an appropriately-sized center opening in end plate 14 and terminal board 17 and receives a nut 44 which engages the outer surface of plate 14, see FIG. 1. If either the winding 11 or the dashpot assembly 22 is defective, damaged, or in need of repair, it is simple to remove and replace either of these assemblies by removing nut 44 and withdrawing the dashpot assembly 22. Thus the close tolerance dashpot subassembly is easily separable from the coil subassembly.

The operation and construction of the dashpot assembly 22 should be apparent from the foregoing, however, certain details of the air damper and its adjustment will be reviewed. Since a close sliding fit is provided between plunger 23 and well 27, at least at the ringed end portion of well 27, air cannot easily escape at that point. Thus, when plunger 23 is moved into well 27, a substantially sealed chamber is created in the inner end of tube 28. The primary escape exit for air captured within this chamber is through the bore 39 and communicating port 40, provided that air bleed adjustment screw 41 is positioned to allow the captured air to escape along this passage. The cooperation of adjustment screw 41, bore 39 and port 40 provides an accurate and inexpensive valve which is easily adjusted. Therefore, the rate of air bled from well 27 and consequently the motion of plunger 23 is set by the adjustment of screw 41.

By way of a more specific example of an actual commercial embodiment of the invention, assemblies have been produced utilizing half-hard seamless brass tubing of 0.750 inch nominal outside diameter and 0.031 inch wall thickness for tube 28, and a ring 29 formed of B1113 steel with an outside diameter of 0.985 inch, an inside diameter of 0.744/0.746 inch, and a thickness of 0.125 inch. Here "thickness" refers to the axial dimension, i.e., as measured parallel to the length of tube 28. The ring 29 is pressed onto one end of tube 28 as described and results in a reduction of the inside diameter of the tube by a few thousandths of an ench, e.g., 0.004 inch, as well as shaping of the tube end. A series of balls are forced through the tube in a ballizing operation to size and true the tube and particularly to accurately size and true the bore at the ringed end by expansion of the portion 28a to increase its inner diameter, e.g., by 0.003 inch, in the manner described. The armature/plungers are of 0.6865 inch nominal diameter including the lubricant coating. However, the coating thickness and thus the final diameter vary somewhat. Accordingly, in present practice, the tubes are ballized to slightly different sizes and the plungers are sorted by size and matched with the appropriate size of the tube for best fit. During the tube sizing operation, the outer diameter of the ring increases slightly, demonstrating that the ring also is expanded during the sizing expansion of the tube bore. It is believed that there also may be some flowing of the metal of the tube out of the ringed zone. In any event, the entire inner surface of the support ring is in compressive contact with the tube wall, which permits the forming and maintenance of the tube of this portion to the necessary close tolerances of the circularity and size of the bore for the functionally air-tight sliding seal with the armatures. The ballizing operation also trues and sizes the remainder of the tube 28 adequately for free movement of the plunger, with the main body portion 28b of the tube beyond the reinforced end at ring 29 being of slightly greater inner diameter. The plug 35 also is formed of steel, with shoulder 36 being 0.692–0.694 inch in diameter.

In addition to diameter tolerance control of the armatures, the coating thickness is controlled as accurately as possible. However, a selection process also has been beneficial in the final mating of armatures and tube wells as noted for best results.

By making ring 29 of steel or another material which is of high magnetic permeability, the ring enhances the magnetic characteristics of the solenoid as well as serving the sizing and reinforcing functions.

It will be appreciated, particularly by those skilled in the art, that many modifications and variations may be made in the embodiment shown and described without departing from the spirit and scope of the invention. By way of examples, certain alternatives have been noted within the foregoing description. As to other examples, the tube may be sized and trued by use of a mandrel or other similar expanding and truing means in place of the ballizing, other types of metering valves may be used, and other mounting arrangements may be provided, both for securing the dashpot assembly within the coil and for mounting the entire solenoid on other apparatus. Moreover, while the described separable dashpot assembly embodiment is preferred for the reasons noted, the manufacturing techniques and reinforcing arrangement may be used for solenoids in which the tube becomes an integral, nonremovable part of a solenoid unit.

It will be appreciated that improvements have been provided which meet the aforestated objects.

While there has been shown and described a preferred embodiment of the present invention, it will be apparent to those skilled in the art that further changes and modifications may be made without departing from the invention in its broader aspects. It is, therefore, contemplated in the appended claims to cover all such changes and modifications as fall within the true spirit and scope of the present invention.

What is claimed is:

1. A method of manufacturing a well for a dashpot assembly of a damped solenoid wherein a substantially sealed chamber is formed between a reciprocable cylindrical plunger and said well, and such assembly is provided in the field structure of the solenoid, comprising the steps of reducing the diameter of one portion of a seamless tube of a predetermined length and uniform nominal diameter and positioning a support having an inner surface of an accurate predetermined inside diameter around said portion, sizing and contouring said tube with said support therearound to a predetermined accuracy of the size and configuration of the bore within said portion by expanding the tube wall of said portion against said inner surface of said support, whereby said support maintains the size and configuration of said bore within said portion, and closing said tube in an area remote from said portion, for receiving a cylindrical plunger for reciprocation through said portion and toward and away from such closure while maintaining effective fluid-sealing relation with said bore of said portion.

2. A method as in claim 1 wherein said support ring is formed of a malleable material.

3. A method as in claim 1 wherein said closing step comprises applying a closure member having an interference fit with said tube.

4. A method as in claim 1 wherein said sizing and contouring includes forcing a series of accurately sized and shaped balls of progressively larger diameters through said tube.

5. A method as in claim 1 wherein said ring is applied on one end portion of said tube with an interference fit.

6. A method as in claim 5 wherein the inner diameter of said ring prior to mounting on said tube is about 0.005 inch smaller than the outer diameter of said one end of said tube, and said tube is yieldable to conform to said ring.

7. A method as in claim 5 wherein said closing step comprises applying a closure member within the end of said tube remote from said ring, said closure member having an interference fit with said wall of said tube.

8. A method as in claim 7 wherein said closure member is of an outer diameter about 0.005 inch greater than the inner diameter of said tube prior to applying said closure member to said tube, and said tube is yieldable to conform to said closure member.

9. A method for manufacturing a well for a dashpot assembly of a damped solenoid wherein a substantially sealed chamber is formed between a reciprocable plunger and said well, and such assembly is provided in the field structure of the solenoid, comprising the steps of positioning a support having an inner surface of an accurate predetermined inside diameter around one portion of a seamless tube of a predetermined length and uniform nominal diameter, sizing and contouring said tube with said support therearound to a predetermined clearance diameter of the bore within said tube, including expanding the tube wall of said portion to a predetermined size and configuration of the bore within said portion with said support in circumannular compressive engagement with said portion, and closing said tube in an area remote from said portion, for receiving a plunger for reciprocation through said portion and toward and away from such closure while maintaining effective fluid-sealing relation with said bore of said portion.

* * * * *

UNITED STATES PATENT OFFICE
CERTIFICATE OF CORRECTION

Patent No. 3,852,871          Dated December 10, 1974

Inventor(s)   Reginald A. Read, Jr.

It is certified that error appears in the above-identified patent and that said Letters Patent are hereby corrected as shown below:

In the title, "WASHPOT" should read -- DASHPOT --.
Column 1, line 2, in the title, "WASHPOT" should read
-- DASHPOT --.

Signed and sealed this 11th day of March 1975.

(SEAL)
Attest:

RUTH C. MASON
Attesting Officer

C. MARSHALL DANN
Commissioner of Patents
and Patents